(12) United States Patent
Torno et al.

(10) Patent No.: US 6,311,671 B1
(45) Date of Patent: Nov. 6, 2001

(54) METHOD FOR REGULATING KNOCKING IN IGNITION SYSTEMS OF INTERNAL COMBUSTION ENGINES

(75) Inventors: Oscar Torno, Schwieberdingen; Carsten Kluth, Stuttgart, both of (DE); Robert Sloboda, Yokohama (JP); Werner Haeming, Neudenau (DE); Iwan Surjadi, Vaihingen (DE); Michael Baeuerle, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,466
(22) PCT Filed: Jul. 30, 1998
(86) PCT No.: PCT/DE98/02183
§ 371 Date: May 19, 2000
§ 102(e) Date: May 19, 2000
(87) PCT Pub. No.: WO99/10651
PCT Pub. Date: Mar. 4, 1999

(30) Foreign Application Priority Data

Aug. 27, 1997 (DE) ............................................... 197 37 257

(51) Int. Cl.[7] ....................................................... F02P 5/00
(52) U.S. Cl. ................................. 123/406.29; 123/406.38
(58) Field of Search ........................... 123/406.29, 406.38

(56) References Cited

U.S. PATENT DOCUMENTS

| | | |
|---|---|---|
| 4,261,313 | 4/1981 | Toshiharu et al. . |
| 4,811,714 * | 3/1989 | Akasu .............................. 123/406.29 |
| 4,829,962 | 5/1989 | Guenther et al. . |
| 5,165,378 | 11/1992 | Yukio . |
| 5,673,667 * | 10/1997 | Nakamura ........................ 123/406.29 |
| 5,738,074 * | 4/1998 | Nakamura et al. ............. 123/406.29 |
| 5,992,385 * | 11/1999 | Hess et al. ....................... 123/406.29 |

FOREIGN PATENT DOCUMENTS

| | | |
|---|---|---|
| 33 13 036 C2 | 10/1984 | (DE) . |
| 2 498 255 | 7/1982 | (FR) . |
| 91 10829 | 7/1991 | (WO) . |
| 96 16269 | 5/1996 | (WO) . |

* cited by examiner

Primary Examiner—John Kwon
(74) Attorney, Agent, or Firm—Kenyon & Kenyon

(57) ABSTRACT

A method for controlling knocking in internal combustion engines. According to this method, a map ignition angle is determined on the basis of detected operating parameters, to which a correction value is additively applied when knock events occur. The correction value is a function of a knock frequency.

4 Claims, 1 Drawing Sheet

METHOD FOR REGULATING KNOCKING IN IGNITION SYSTEMS OF INTERNAL COMBUSTION ENGINES

BACKGROUND INFORMATION

The present invention relates to a method for controlling knocking. A knock control system is already known from German Patent No. 33 13 036, in which at least one knock sensor and a downstream signal conditioning arrangement are provided and in which a knocking combustion event is detected when the conditioned knock sensor signal exceeds a reference level. To prevent knocking operation of the internal combustion engine, an electronic controller is provided which influences knocking in the internal combustion engine by correspondingly controlling different functions, such as the ignition function. For example, upon detecting knocking combustion events, the ignition function is adjusted stepwise away from the knock limit. A method is also known for stepwise cancellation of the ignition function adjustment after a knocking combustion event once the knocking combustion event is no longer present, with stepped return adjustment accelerating when a transient state is detected.

SUMMARY OF THE INVENTION

The method according to the present invention with the characterizing features of the has the advantage that the difference in the knock-induced ignition timing adjustment enables the knock control system to perform a very accurate adjustment of the ignition angle as a function of knock frequency, depending on the requirements. Furthermore, it achieves a much faster adjustment of the knock control system to the current knock limit, which is dependent on instantaneous operating conditions, such as load and rotational speed. Finally, this form of knock control has the advantage that the various knock-control-related differences in the ignition angle produce only minor torque fluctuations.

One particular advantage is the fact that the number of non-knocking combustion events between two knocking combustion events, or the time between two knocking combustion events, is a measure of knock frequency. Likewise, the speed at which the ignition angle is returned can be determined by the step size or step frequency as a function of the predetermined adjustment away from the knock limit. This ensures that the ignition angle returns much more accurately to the knock limit with small steps in the retard adjustment, thereby avoiding an unnecessary fluctuation of the ignition angle at the knock limit.

DETAILED DESCRIPTION

Figure 1:
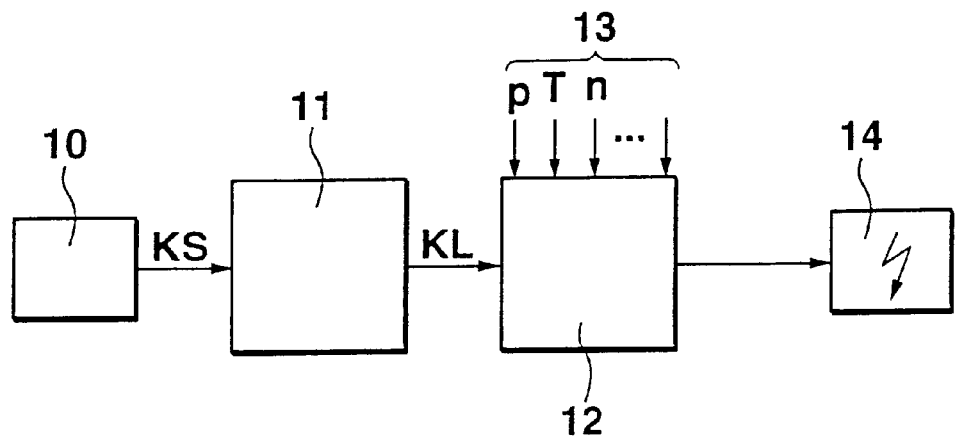
FIG. 1 shows a block diagram of an embodiment according to the present invention.

FIG. 1 shows a schematic block diagram of the knock control system. A knock sensor 10 detects knock signals KS and directs them to a signal conditioning arrangement 11. The output of signal conditioning arrangement 11 is supplied to an electronic controller 12, which is thus provided with the positive or negative knock signal. A detailed explanation of the layout and operation of signal conditioning arrangement 11 is provided, for example, in German Patent No. 33 13 036 mentioned above, and will not be specifically reiterated here. Electronic controller 12 is further provided with the parameters detected by combustion chamber sensors (also not illustrated) for the operating conditions of the internal combustion engine, for example pressure p, temperature T, and rotational speed n, in the form of input quantities 13. On the output side, electronic controller 12 influences an ignition output stage 14, which generates the ignition signals for the internal combustion engine. Alternatively, this controller 12, which is preferably designed as a microprocessor, can, of course, also control other functions of the internal combustion engine that affect the knocking action. Controller 12 calculates the respective control quantities as a function of the parameters supplied in the form of input quantities 13, with the ignition time, for example, and possibly the dwell angle being determined with the help of a stored ignition map. If only one knocking combustion event KL occurs, the ignition angle is altered stepwise in the retard direction and thus away from the knock limit. After a selectable period of time, during which no knocking combustion events take place, or after a selectable number of non-knocking combustion events, the ignition angle is returned in the advance direction until it reaches map ignition angle ZW(KF) again.

Figure 2:
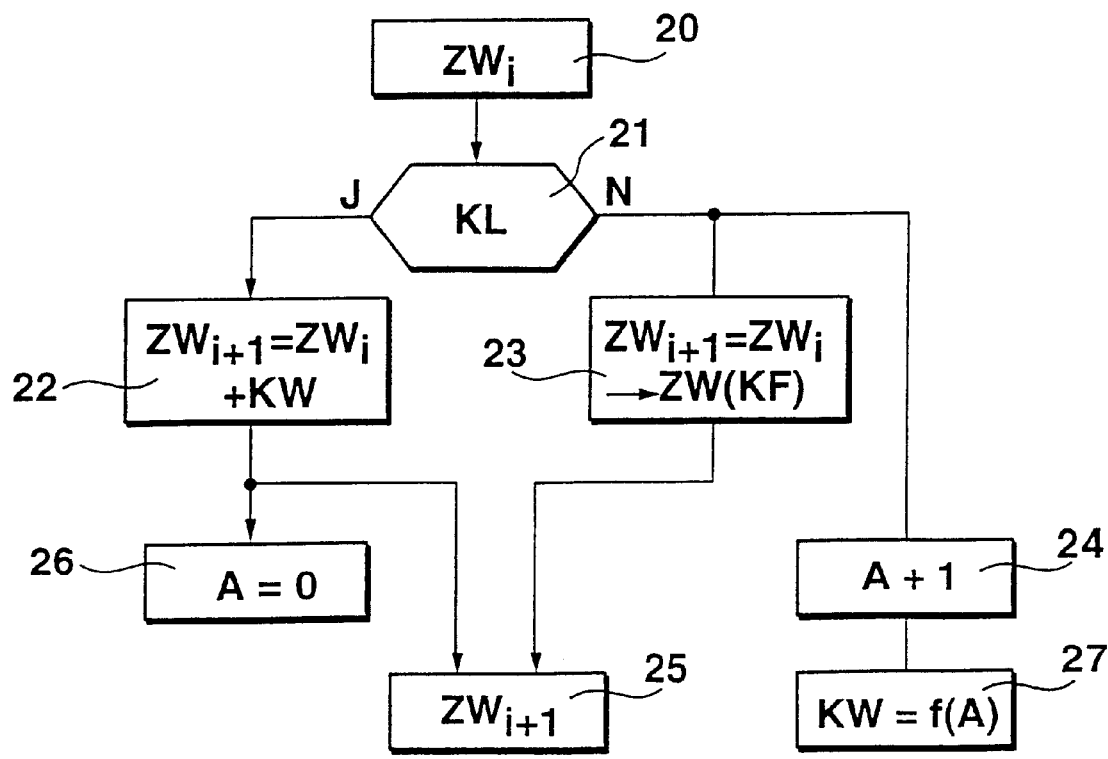
FIG. 2 shows the process steps of the method according to the present invention.

The implementation of the method according to the present invention is explained below on the basis of FIG. 2. In a first program step 20, FIG. 2 shows ignition angle $ZW_i$, for example calculated and output as a function of the detected operating parameters using an ignition map. However, this ignition angle $ZW_i$ can also be an ignition angle that was previously adjusted during earlier knocking combustion events. A query 21 subsequently checks whether a knock KL occurred during the combustion action of the output ignition. If a knock did occur, a positive response is returned as the output of query 21, leading to step 22, where output ignition angle $ZW_i$ is additively adjusted by a correction value KW away from the knock limit, i.e., the ignition angle is altered in the retard direction. If no knock occurs during the combustion event having output ignition angle $ZW_i$, a negative response is returned for query 21. Step 23 checks whether the output ignition angle was already an ignition angle adjusted in the retard direction, after which output ignition angle $ZW_i$ may be returned stepwise in the advance direction again toward the map ignition angle, $ZW_{i+1}=ZW_i \rightarrow ZW(KF)$. In parallel with step 23, a step 24 counts the number of non-knocking combustion events. This is done, for example, by incrementing a register by one each time a non-knocking combustion event occurs (A+1). The outputs of steps 22 and 23, in which ignition angle $ZW_{i+1}$ is defined for each subsequent ignition, are supplied to a step 25, which then outputs this ignition angle $ZW_{i+1}$ for the subsequent ignition. The output of step 22 is additionally supplied to a step 26, where the value of the register for counting the non-knocking combustion events is reset to zero. The output of step 24, which counts the number of non-knocking combustion events, is also connected to a step 27. This step determines correction value KW for correcting the ignition angle in the retard direction after a knocking combustion event. This correction value KW is a function of the knock frequency, i.e., the higher the value A, the higher the value for the additive knock adjustment and vice versa. Instead of the number of non-knocking combustion events, the time between two non-knocking combustion events can also be detected, in which case this detected time is then also compared to the rotational speed.

This knock frequency value is determined separately for each cylinder. The number of non-knocking ignitions is thus a measure of knock frequency, and the time between two consecutive knock events can also be detected as a measure of knock frequency. Based on this knock frequency, the additive ignition angle retard adjustment step can be calculated in the form of a curve when a knock occurs. If knock events occur in rapid succession, a larger adjustment step is defined, according to the present invention, than if the knock events are spaced farther apart.

This makes it possible to accurately adjust the ignition angle according to the requirements, using the knock control system.

What is claimed is:

1. A method for controlling a knocking in an internal combustion engine, comprising the steps of:

detecting a plurality of operating parameters;

determining a map ignition angle on the basis of the detected operating parameters;

defining a step size of a correction value as a function of a knock frequency; and additively applying a correction value to the map ignition angle when the knocking occurs.

2. The method according to claim 1, wherein:

a number of non-knocking combustion events between knocking combustion events is a measure of the knock frequency.

3. The method according to claim 1, wherein:

a time between two knocking combustion events is a measure of the knock frequency.

4. The method according to claim 2, further comprising the step of:

counting in a register the number of non-knocking combustion events.

* * * * *